United States Patent [19]

Sekiguchi

[11] Patent Number: 4,651,704
[45] Date of Patent: Mar. 24, 1987

[54] BREATHER ARRANGEMENT FOR CAM CASE OF INTERNAL COMBUSTION ENGINE

[75] Inventor: Norio Sekiguchi, Utsunomiya, Japan
[73] Assignee: Honda Giken Kogyo Kabushiki Kaisha, Tokyo, Japan
[21] Appl. No.: 822,513
[22] Filed: Jan. 27, 1986
[30] Foreign Application Priority Data Jan. 30, 1985 [JP] Japan ................................. 60-14341

[51] Int. Cl.$^4$ ............................................ F02B 47/08
[52] U.S. Cl. ................................. 123/572; 123/90.27
[58] Field of Search ...................... 123/572, 573, 90.27
[56] References Cited

U.S. PATENT DOCUMENTS 3,326,198 6/1967 Jackson ................................ 123/572
4,205,642 6/1980 Nishimura et al. ................. 123/572
4,270,508 6/1981 Lindberg .............................. 123/572
4,329,968 5/1982 Ishikawa et al. .................... 123/572

FOREIGN PATENT DOCUMENTS 1097755 1/1961 Fed. Rep. of Germany ...... 123/572
1476036 3/1969 Fed. Rep. of Germany ...... 123/572
2103061 8/1971 Fed. Rep. of Germany ...... 123/572

Primary Examiner—Ronald B. Cox
Attorney, Agent, or Firm—Armstrong, Nikaido, Marmelstein & Kubovcik

[57] ABSTRACT

A breather arrangement for an internal combustion engine includes a hollow cam shaft which is disposed in a cam case of the engine. Blow-by gas in the cam case is admitted into an axial bore of the cam shaft, while oil entrained by the gas is separated by centrifugal forces due to rotation of the cam shaft. This allows only the blow-by gas to be recirculated to an intake system of the engine.

11 Claims, 4 Drawing Figures

BREATHER ARRANGEMENT FOR CAM CASE OF INTERNAL COMBUSTION ENGINE

BACKGROUND OF THE INVENTION

The present invention relates to a breather arrangement associated with a cam case of an internal combustion engine and, more particularly, to a breather arrangement which ventilates a cam case and/or a crankcase while preventing blow-by gas from being emitted from the cam case and/or the crankcase to the atmosphere.

In the automotive internal combustion engine, blow-by gas produced in a cam case and a crankcase is recirculated to an intake system so that it may be burned in combustion chambers and not be emitted to the atmosphere. The recirculation is usually implemented by a conduitwork which draws out blow-by gas produced in the crankcase by way of the cam case or draws it out directly from both the crankcase and the cam case. The prerequisite with such a conduitwork is that the blow-by gas be prevented from entraining engine oil out of the crankcase and cam case and causing it to be wastefully burned in the combustion chambers. This prerequisite has heretofore been fulfilled by arranging an oil separator at the or each blow-by gas outlet for separating engine oil from blow-by gas.

Oil separators proposed in the past include a breather chamber which is furnished with several baffle plates, as disclosed in Japanese Utility Model Publication Nos. 57-32247 and 57-50486, for example. The problems with the prior art breather chamber schemes are that when applied to a cam case the breather chamber has to be defined in an upper portion of the cam case, and that the breather chamber cannot attain sufficient oil separation ability unless provided with a considerable capacity. These directly translate into an increase in the overall height of the engine so that where such an engine is used to power an automotive vehicle, the hood line of the vehicle need be undesirably raised.

SUMMARY OF THE INVENTION

It is therefore an object of the present invention to separate oil from blow-by gas without the need for a large-capacity breather chamber and, thereby, provide a compact engine.

It is another object of the present invention to promote efficient separation of oil from blow-by gas utilizing centrifugal forces.

It is another object of the present invention to implement a breather arrangement utilizing a cam shaft which is disposed in a cam case, thereby enhancing effective use of a limited space available in an engine.

It is another object of the present invention to allow cam slipper surfaces to be lubricated by oil which is separated from blow-by gas.

In order to achieve these objects, in accordance with the present invention, a cam shaft accommodated in a cam case is made hollow so that a bore extending axially through the cam shaft serves as a breather passageway. The cam shaft is formed with blow-by gas inlet openings and oil discharge openings each providing fluid communication between the bore of the cam shaft and the outside of the cam shaft. The bore of the cam shaft is communicated to a breather pipe which in turn is communicated to an engine intake system.

In the above construction, blow-by gas in the cam case is admitted into the bore of the cam shaft through the blow-by gas inlet openings. Inside of the bore, oil entrained by the blow-by gas is forced against the wall of the bore by centrifugal forces due to rotation of the cam shaft and, then, discharged through the oil discharge openings.

As a result, only the blow-by gas is propagated into the breather pipe with the oil subjected to centifugal separation. Hence, it is needless to provide a large-capacity breather chamber in the cam case which would otherwise increase the overall engine height.

Generally, the blow-by gas inlet openings are formed in sections of the cam other than cam shaft sections and journal sections which are constantly exposed to the interior of the cam case. The oil discharge openings, on the other hand, are provided in the cam sections of the cam shaft. Preferably, the oil discharge openings are each positioned in a lobe portion of the associated can section so that as great a centrifugal force as possible may act on the oil. Alternatively, they may each be provided in a portion other than the lobe portion in order to insure a sufficiently large area of contact between the lobe portion and a rocker arm associated with the lobe portion.

In a preferred embodiment, the diameter of the bore in the cam shaft is reduced in those parts where the blow-by gas inlet openings are provided, thereby preventing the separated oil in the bore from stopping up the blow-by gas inlet openings. The bore of the cam shaft is communicated to the breather pipe through a partition having an aperture which is coaxial with the bore. This retrains the oil separated in the cam shaft from advancing toward the breather pipe.

Usually, the bore in the cam shaft is communicated to the breather pipe at one end of the cam shaft which carries a cam shaft drive pulley at the other end. In this case, the communication of the bore to the breather pipe may be set up by a passageway which is formed throughout a bolt, which is adapted to fix a cylinder head cover in place. Alternatively, it may be set up by a joint member having a labyrinth portion which is coupled in an opening formed through the end of the cam shaft.

Such a breather arrangement which utilizes a hollow cam shaft will offer especially prominent effects when applied to a double overhead camshaft engine in which a cam shaft for driving intake valves and a cam shaft for driving exhaust valves are installed independently of each other.

The above and other objects, features and advantages of the present invention will become more apparent from the following detailed description taken with the accompanying drawings.

DESCRIPTION OF THE PREFERRED EMBODIMENTS

To better understand the present invention, a brief reference will be made to a prior art breather arrangement, shown in FIG. 1.

Figure 1:
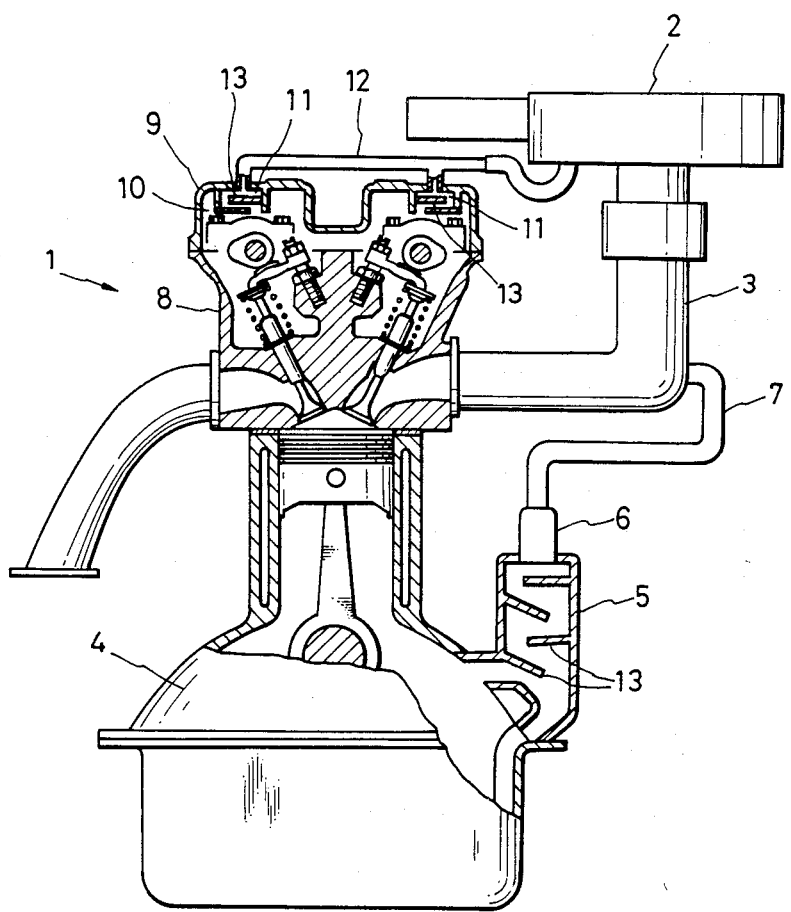
FIG. 1 is a partly taken away schematic front view of an internal combustion engine which is equipped with a prior art breather arrangement.

In FIG. 1, an internal combustion engine, generally 1, is supplied with air through an air cleaner 2 and an intake manifold 3. The engine 1 includes a crankcase 4 which is provided with a breather chamber 5 at one side thereof. The breather chamber 5 is communicated to the intake manifold 3 by a conduit 7 in which a ventilation valve 6 is disposed. A cylinder head 8 of the engine 1 and a cylinder head cover 9 define a cam case 10 therebetween. A breather chamber 11 is provided in an upper portion of the cam case 10 and communicated to the air cleaner 2 by a conduit, or breather pipe, 12. A plurality of baffle plates 13 are arranged in each of the breather chambers 5 and 11 in order to separate oil from blow-by gas which flows through the breather chamber 5 or 11.

In a blow-by gas recirculation system having the above construction, during light-load operation of the engine 1, the ventilation valve 6 is opened due to high intake vacuums which prevail in the intake manifold 3, with the result that the blow-by gas in the crankcase 4 is sucked into the intake manifold 3 through the conduit 7. In the meantime, fresh air is communicated to the cam case 10 through the air cleaner 2 and breather pipe 12. During heavy-load operation, on the other hand, blow-by gas is drawn out from the cam case 10 toward the air cleaner 2 through the breather pipe 12.

As described above, the crankcase 4 and the cam case 10 are each ventilated. The blow-by gas from which oil is separated by the breather chamber 5 or 11 is recirculated to the intake system inclusive of the air cleaner 2 and the intake manifold 3. In another known arrangement, both the crankcase 4 and the cam case 10 are communicated to the air cleaner 2 or, alternatively, a piping is so constructed as to return the blow-by gas from the crankcase 4 to the intake system by way of the cam case 10.

In this manner, the prior art breather arrangement relies on the breather chamber 11 in separating oil from blow-by gas which is sucked out of the cam case 10. The breather chamber 11 need be located above the cam case 10 and provided with the baffle plates 13 and other exclusive parts. In addition, the breather chamber 11 cannot offer sufficient oil separation ability unless provided with a considerable capacity. These add to the overall height of the engine 1 and, thereby, invite the need for a higher hood line when the engine 1 is mounted in an automotive vehicle.

The present invention contemplates to provide a solution to the above-discussed problem and will hereinafter be described in relation to preferred embodiments thereof. In the following embodiments, the blow-by gas recirculation system is essentially similar to that of FIG. 1 and, therefore, the same or similar structural elements are designated by like reference numerals and will not be described any further.

Figure 2:
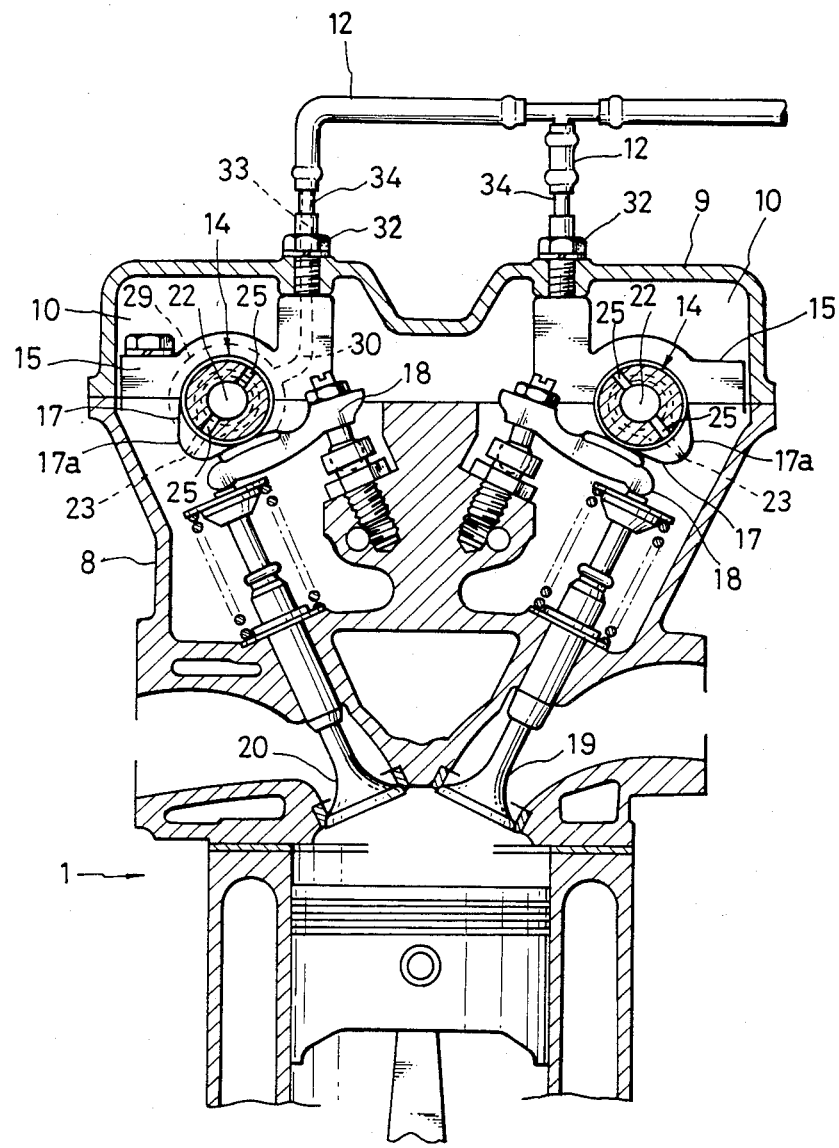
FIG. 2 is a fragmentary vertical section, as viewed from the front, of an engine to which a breather arrangement for a cam case embodying the present invention is applied.
Figure 3:
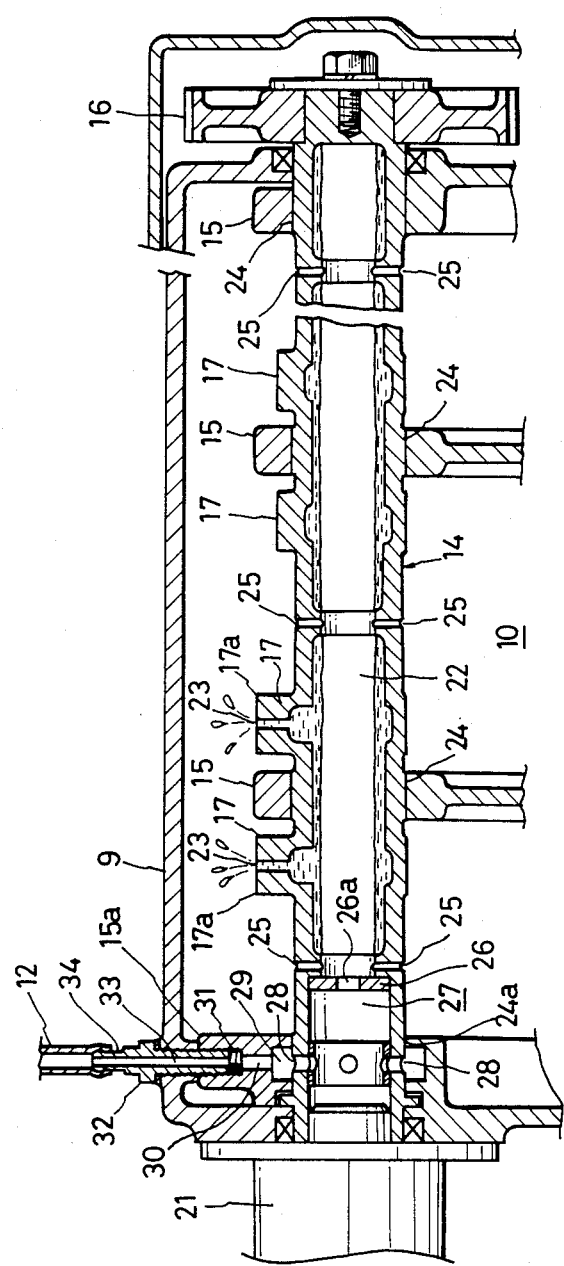
FIG. 3 is a sectional side elevation of a cam shaft and its associated elements which are included in the engine of FIG. 2.

Referring to FIG. 2, an internal combustion engine to which the present invention is applied is shown which is of the type having a double overhead camshaft type valve actuating mechanism. The engine, generally 1, includes a cylinder head 8 which supports a pair of cam shafts 14 through cam holders 15, respectively. As shown in FIG. 3, a drive pulley 16 is mounted on one end of each of the cam shafts 14 to be rotated by a timing belt, not shown, which in turn is driven by a crankshaft of the engine 1. The cylinder head 8 also supports rocker arms 18 which are associated with cam sections 17 of the cam shafts 14. The arrangement is such that upon rotation of the cam shafts 14 the rocker arms 18 are pivotally moved to open and close their associated intake valves 19 and exhaust valves 20. As shown in FIG. 3, an auxiliary implement 21 such as a distributor or a crank angle sensor is connected to the other end of each cam shaft 14 opposite to the drive pulley 16 in such a manner as to be rotated by the cam shaft 14.

As shown in FIGS. 2 and 3, each cam shaft 14 is made hollow during casting to have an axially extending bore 22. Such a hollow cam shaft configuration is usually made use of in engines for the purpose of reducing the weight of a cam shaft. In each of the cam sections 17, the bore 22 has a cross-section which is offset in conformity to a particular cam profile of the cam section 17. An oil discharge opening, or passageway, 23 extends throughout each of the cam sections 17 from the periphery of a lobe portion 17a to the bore 22. The suitable number of blow-by gas inlet openings, or passageways, 25 extend radially throughout the wall of each hollow cam shaft 14 between the nearby cam sections 17 or between the cam sections and journal sections 24, which respectively are supported by the cam holders 15. The inside diameter of the bore 22 is reduced at those portions thereof where the passageways 25 are open.

As shown in FIG. 3, a circular partition 26 having an aperture 26a is fit in the bore 22 of each cam shaft 14 at that end of the latter which is opposite to the drive pulley 16, or adjacent to the auxiliary implement 21, the aperture 26a being coaxial with the bore 22. The partition 26 serves to define a blow-by gas outlet chamber 27. An end journal section 24a of the cam shaft 14 is formed with openings 28 so that the chamber 27 is communicated to the outer periphery of the end journal section 24a. An end cam holder 15a adapted to support the end journal section 24a is provided with an annular recess, or groove, 29 in the inner periphery thereof which is aligned with the openings 28 of the end journal section 24a. The annular recess 29 is contiguous with a passageway 30 of the cam holder 15a which in turn is communicated to a threaded bore 31, which is provided in an upper portion of the cam holder 15a. The threaded bore 31 is adapted to receive a bolt 32 which is used to fix a cylinder head cover 9 in place. The bolt 32 is provided with an axially extending passageway 33, and a joint section 34 at the top thereof for connection with the breather pipe 12.

As described above, the bore or breather passageway 22 in each cam shaft 14 is communicated to the cam case 10 by the blow-by gas inlet passageways 25 and oil discharge passageways 23 and to the blow-by gas outlet chamber 27 by the aperture 26a of the partition 26 and, therefore, to the breather pipe 12 which is communicated to the chamber 27 by the passageway 33 of the bolt 32, threaded bore 31, passageway 30, annular recess 29, and openings 28.

In operation, as the engine 1 is driven, the cam shafts 14 are each rotated at a speed which is half that of the crankshaft. While the load acting on the engine 1 is heavy, the blow-by gas in the cam case 10 is admitted into the breather passageway 22 of the cam shaft 14 through the blow-by gas inlet passageways 25, while entrailing oil mist which fills the cam case 10. However, since the cam shaft 14 is rotating at such a high speed, the oil is forced against the wall of the bore 22 due to centrifugal forces and, thereby, separated from the blow-by gas. The oil collected on the wall of the bore 22 is returned to the interior of the cam case 10 through the oil discharge openings 23.

As previously stated, the oil discharge openings 23 are provided in the lobe portions 17a of their associated cam sections 17 so that they open into the bore 22 at positions which are remoter from the axis of the cam shaft 14 than the other portions. At those particular positions, therefore, the oil is subjected to centrifugal forces of great intensity to be thereby discharged quite efficiently. The oil coming out through the openings 23 serve to provide lubrication between the sliding surfaces of the cam sections 17 and their associated rocker arms 18. That is, the openings 23 23 serve as lubricant supply passageways for slipper surfaces.

Furthermore, the inside diameter of the bore 22 is reduced in those portions of the cam shaft 14 where the blow-by gas inlet openings 25 are provided, as also previously mentioned. Stated another way, the blow-by gas inlets 25 open into the bore 22 at higher levels than the other portions. This prevents the oil from becoming deposited in and around the inlets 25 to stop them up.

The blow-by gas released the oil mist is admitted into the blow-by gas discharge chamber 27 through the aperture 26a of the partition 26. From the chamber 27, the gas is routed through the annular recess 29 and passageway 30 of the end cam holder 15a, passageway 33 of the bolt 32, and breather pipe 12 to an intake system of the engine 1, e.g. air cleaner 2 or intake manifold 3. In this instance, the partition 26 serves to intercept the oil which is apt to advance from the passageway 22 toward the chamber 27 together with the gas. As another implementation for checking the flow of oil, the inside diameter of the crank shaft 14 may be reduced at those portions where the openings 28 are provided.

During light-load operation of the engine 1, fresh air coming in through the breather pipe 12 may sometimes be routed through the above-mentioned conduitwork but in the opposite direction to reach the breather passageway 22 of the cam shaft 14. Then, the blow-by gas inlet passageways 25 will allow the fresh air into the cam case 10.

In the above-described manner, the blow-by gas in the cam case 10 is discharged to ventilate the cam case 10.

In this particular embodiment, fluid communication between the breather passageway 22 and the breather pipe 12 is set up through the end cam holder 15a which is located at the opposite side to the drive pulley 16. Alternatively, such may be implemented using an intermediate one of the cam holder 15.

While the auxiliary implement 21 has been shown and described as being directly driven by the cam shaft, 14, it may be indirectly driven by the cam shaft 14 through a gear or the like. The indirect drive scheme allows the breather pipe 12 to be connected to the end of the cam shaft 14 in an easy and simple arrangement.

Figure 4:
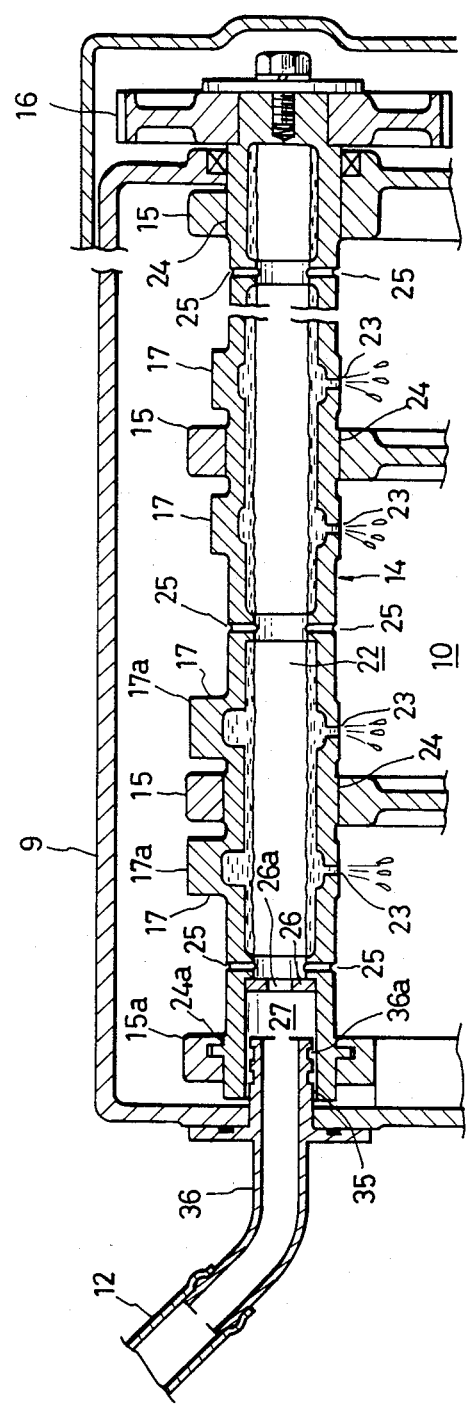
FIG. 4 is a view similar to FIG. 3 but showing another embodiment of the present invention.

Referring to FIG. 4, another embodiment of the present invention is shown in which the breather pipe 12 is connected to the end of the cam shaft 14 as stated above. In FIG. 4, the same or similar structural elements as those shown in FIGS. 2 and 3 are designated by like reference numerals.

In the illustrative embodiment of FIG. 4, the bore 22 of the cam shaft 14 is open at one end which is remote from the drive pulley 16. A joint member 36 is coupled in the open end 35 of the bore 22. While the oil discharge openings 23, like those of FIGS. 2 and 3, are provided in the cam sections 17, each is positioned remote from the cam lobe portion 17a such as in opposing relation or in perpendicular relation to the cam lobe portion 17a. The rest of the configuration of the cam shaft 14 in FIG. 4 is the same as that of FIGS. 2 and 3.

The tip of the joint member 36 which is disposed in the open end 35 of the cam shaft 14 is provided with a labyrinth portion 36a. While allowing the cam shaft 14 to rotate relative to the joint member 36, the labyrinth portion 36a restricts the blow-by gas which is apt to flow out through between the cam shaft 14 and the joint member 36. The breather pipe 12 is connected to the other end of the joint member 36.

In this construction, the breather passageway 22 is communicated to the breather pipe 12 through the aperture 26a of the partition 26, blow-by gas discharge chamber 27, and joint member 36.

In this particular embodiment, too, the oil entrained by the blow-by gas into the passageway 22 of the cam shaft 14 is separated by centrifugal forces due to rotation of the cam shaft 14 and, then, returned to the cam case 10 through the oil discharge passageways 23. Although the oil discharge performance attainable with the embodiment of FIG. 4 is somewhat inferior to that attainable with the embodiment of FIGS. 2 and 3 because the oil discharge openings 23 are not located in the cam lobe portions 17a, the rotation speed of the cam shaft 14 is high enough the insure positive discharge of the oil. Rather, locating the openings 23 in the portions other than the cam lobe portions 17a, which have to withstand the greatest surface pressures, is effective to prevent the contact area between the associated cam lobe portion 17a and the rocker arm 18 from being reduced; otherwise wear of the cam lobe portions 17a would be enhanced. To further promote lubrication of the slipper surfaces, each of the oil discharge openings 23 may be located such that it faces the associated rocker arm 18 just before the cam lobe portion 17 does. It will be noted that such a particular location of each the openings 23 which is other than the cam lobe portion 17a is also applicable to the embodiment of FIGS. 2 and 3.

In any of the embodiments shown and described, the blow-by gas inlet openings 25 are positions in the sections of the cam shaft 14 other than the cam sections 17 and journal sections 24 so that they may remain in constant communication with the interior of the cam case 10. However, such is only illustrative and may be replaced by a configuration in which the openings 25 are provided in the journal sections 24 to communicate to the cam case 10 through the cam holders 15, or a configuration in which the blow-by gas discharge chamber 27 is defined in the end of the cam shaft 14 adjacent to the drive pulley 16 with the open end 35 used as a blow-by gas inlet 25. Likewise, the oil discharge openings 23 may be formed in the journal sections 24 of the cam shaft 14 such that oil coming out therethrough serve an additional lubricating function.

The partition 26 with the aperture 26a which is disposed in the bore 22 may be replaced by a small-diameter pipe which extends from the wall of the bore 22 toward the axis of the same. In this case, the blow-by gas which has released oil mist will be routed to the destination by the small-diameter pipe.

While the present invention has been shown and described in relation to a double overhead camshaft engine, it is similarly applicable to a single overhead camshaft engine. Nevertheless, considering the capability of recirculating a great amount of blow-by gas, the present invention is especially suitable for use with the double overhead camshaft engine 1 furnished with two cam shafts 14 which respectively are adapted to actuate the intake valves 9 and the exhaust valves 20.

In summary, it will be seen that the present invention provides a breather arrangement for a cam case of an internal combustion engine which accomplishes efficient separation of oil from blow-by gases because it routes blow-by gases through an axial bore of a hollow cam shaft, while separating oil by centrifugal forces due to rotation of the cam shaft. The present invention, therefore, eliminates the need for breather chambers having large volumes so that a cylinder head cover can be designed with a minimum of height to consequently cut down the overall height of the engine. In the case of an engine mounted in an automobile, such makes it possible to lower the level of the hood line.

In addition, the present invention takes advantage of a bore which is formed in a cam shaft for a light-weight construction as a usual practice and does not need any special or additional part. The resulting breather arrangement is compact, lightweight, and inexpensive.

Various modifications will become possible for those skilled in the art after receiving the teachings of the present disclosure without departing from the scope thereof.

What is claimed is:

1. A breather arrangement for a cam case of an internal combustion engine, comprising:
   a hollow can shaft disposed in the cam case and formed with a bore extending axially therethrough, at least one blow-by gas inlet opening for admitting blow-by gas in the cam case into said bore, and at least one oil discharge opening for discharging oil which is deposited in said bore; and
   a breather pipe to one end of which said bore of said hollow cam shaft is communicated, the other end of said breather pipe communicating to an intake system of the engine.

2. A breather arrangement as claimed in claim 1, wherein the blow-by gas inlet opening extends radially throughout a particular section of the cam shaft other than a cam section and a journal section, said particular section being exposed to the interior of the cam case.

3. A breather arrangement as claimed in claim 2, wherein the oil discharge opening is positioned in the cam section of the cam shaft.

4. A breather arrangement as claimed in claim 3, wherein in the cam section of the cam shaft the bore of the cam shaft is shaped to have an offset cross-section in conformity with a cam profile of the cam section, the oil discharge opening being formed in a lobe portion of the cam section.

5. A breather arrangement as claimed in claim 3, wherein the oil discharge opening is located in a portion of the cam section other than a lobe portion.

6. A breather arrangement as claimed in claim 1, wherein an inside diameter of the bore of the cam shaft is reduced in a section thereof where the blow-by gas inlet opening is provided.

7. A breather arrangement as claimed in claim 1, wherein the bore of the cam shaft is communicated to the breather pipe through an aperture which is coaxial with the bore.

8. A breather arrangement as claimed in claim 1, wherein the bore of the cam shaft is communicated to the breather pipe at one end of the cam shaft which is opposite to the other end where a drive pulley for driving the cam shaft is mounted.

9. A breather arrangement as claimed in claim 1, wherein the bore of the cam shaft is communicated to the breather pipe through an annular recess formed in an inner periphery of a cam holder, a passageway formed in the cam holder for communicating said annular recess to a threaded bore, and a passageway formed through a bolt which is received in said threaded bore to fix a cylinder head cover in place.

10. A breather arrangement as claimed in claim 1, wherein the bore of the cam shaft is communicated to the breather pipe by a joint member having a labyrinth portion which is coupled in an open end of the cam shaft.

11. A breather arrangement as claimed in claim 1, wherein a first cam shaft for actuating intake valves of the engine and a second cam shaft for actuating exhaust valves are disposed in the cam case, each of said cam shafts being provided with the axial bore.

* * * * *